US008033350B2

(12) United States Patent
Ono et al.

(10) Patent No.: US 8,033,350 B2
(45) Date of Patent: Oct. 11, 2011

(54) STARTING CONTROL APPARATUS

(75) Inventors: Yasuo Ono, Hyogo (JP); Norio Tsuruta, Hyogo (JP); Takeshi Sakamoto, Hyogo (JP); Masaki Koike, Hyogo (JP)

(73) Assignee: Fujitsu Ten Limited, Kobe-Shi (JP)

( * ) Notice: Subject to any disclaimer, the term of this patent is extended or adjusted under 35 U.S.C. 154(b) by 676 days.

(21) Appl. No.: 11/585,840

(22) Filed: Oct. 25, 2006

(65) Prior Publication Data
US 2007/0106441 A1 May 10, 2007

(30) Foreign Application Priority Data
Oct. 28, 2005 (JP) ................................. 2005-314983

(51) Int. Cl.
B60W 20/00 (2006.01)
(52) U.S. Cl. ................. 180/65.265; 903/930; 180/65.21
(58) Field of Classification Search .............. 180/65.21, 180/65.22, 65.265; 123/179.1, 179.2, 179.3; 903/930
See application file for complete search history.

(56) References Cited

U.S. PATENT DOCUMENTS

| 5,024,186 | A | * | 6/1991 | Long et al. | 123/179.4 |
| 5,482,013 | A | * | 1/1996 | Andrews et al. | 123/179.21 |
| 5,970,938 | A | * | 10/1999 | Hisamoto et al. | 123/179.3 |
| 6,024,065 | A | * | 2/2000 | Hojna et al. | 123/179.3 |
| 6,098,584 | A | * | 8/2000 | Ahner et al. | 123/179.3 |
| 6,250,270 | B1 | * | 6/2001 | Ahner et al. | 123/179.3 |
| 6,286,470 | B1 | * | 9/2001 | Riksen et al. | 123/179.3 |
| 6,445,982 | B1 | * | 9/2002 | Swales et al. | 701/22 |
| 6,708,096 | B1 | * | 3/2004 | Frei et al. | 701/53 |
| 6,864,650 | B2 | * | 3/2005 | Heravi et al. | 318/280 |
| 6,889,645 | B2 | * | 5/2005 | Tumback et al. | 123/179.3 |
| 7,191,053 | B2 | * | 3/2007 | Dery | 701/113 |
| 7,266,791 | B2 | * | 9/2007 | Morishita et al. | 716/4 |
| 7,766,107 | B2 | * | 8/2010 | Joe et al. | 180/65.21 |
| 2006/0052911 | A1 | * | 3/2006 | Ochs et al. | 701/2 |
| 2006/0082316 | A1 | * | 4/2006 | Yahagi et al. | 315/73 |

FOREIGN PATENT DOCUMENTS

| EP | 0 325 960 A2 | * | 8/1989 |
| JP | A 06-137240 | | 5/1994 |
| JP | A 09-303020 | | 11/1997 |
| JP | A 09-322265 | | 12/1997 |
| JP | A 10-131569 | | 5/1998 |
| JP | A 2000-025573 | | 1/2000 |
| JP | A 2001-049917 | | 2/2001 |

(Continued)

OTHER PUBLICATIONS

Japanese Office Action with partial translation mailed Jan. 26, 2010 for Japanese Application No. 2005-314983.

(Continued)

*Primary Examiner* — Frank Vanaman
(74) *Attorney, Agent, or Firm* — Oliff & Berridge, PLC

(57) ABSTRACT

A starting control apparatus that automatically discriminates configuration of a vehicle on which the starting control apparatus is mounted, executes an appropriate starting control, and be widely used is provided. The starting control apparatus prestores therein computer program codes for performing a starting control for normal vehicle and a starting control for hybrid vehicle, discriminates between normal vehicle and hybrid vehicle about the vehicle on which the starting control apparatus is mounted on, and executes one of the starting controls corresponding to a result of discrimination between normal vehicle and hybrid vehicle.

7 Claims, 10 Drawing Sheets

FOREIGN PATENT DOCUMENTS

| | | |
|---|---|---|
| JP | A 2002-130034 | 5/2002 |
| JP | B2 3365716 | 1/2003 |
| JP | B2 3365717 | 1/2003 |
| JP | A 2004-068626 | 3/2004 |
| JP | A 2004-234207 | 8/2004 |
| JP | A 2005-29067 | 2/2005 |
| JP | A-2005-188391 | 7/2005 |
| JP | A 2006-207388 | 8/2006 |
| JP | A-2002-004988 | 1/2009 |

OTHER PUBLICATIONS

Japanese Office Action for corresponding Japanese Patent Application No. 2005-314983, dated Nov. 4, 2009 (with partial English translation).

* cited by examiner

STARTING CONTROL APPARATUS

CROSS-REFERENCE TO RELATED APPLICATIONS

The present document incorporates by reference the entire contents of Japanese priority document, 2005-314983 filed in Japan on Oct. 28, 2005.

BACKGROUND OF THE INVENTION

1. Field of the Invention

The present invention generally relates to a starting control apparatus for controlling starting of a vehicle self-directively or based on a signal received from a remote control terminal. The present invention particularly relates to a starting control apparatus that can be widely used and mounted on vehicles that have difference in configuration factors, such as configuration of driving force generator and in-vehicle local area network (LAN) protocol.

2. Description of the Related Art

Recently, to warm up a vehicle and/or start the air-conditioner of the vehicle in advance, starting control apparatuses have been put into practical. The starting control apparatus makes it possible to start the engine by remote control or at a predetermined time point by using such as a timer (i.e., self-directively), in a situation where the driver is outside the vehicle. The starting control apparatus starts the engine when receiving an engine-start request from a remote control terminal held by the driver (a remote key) by executing operations similarly to when a starting operation is performed by using a key.

Some of the starting control apparatuses are specialized for retrofitting, for example, as an optional part, to a vehicle in a manufacturing plant after the vehicle is manufactured.

Mainly two types of vehicles are available in the market: normal vehicles and hybrid vehicles. A normal vehicle is a vehicle (gasoline engine vehicle, diesel engine vehicle, or the like) that has only an engine as a driving force generator, while an hybrid vehicle is a vehicle that has both an engine and a motor as driving force generators. Conditions for actuation and termination of starting control to be performed by a starting control apparatus, or a making time (ON period) of pulse signals forming a start-request signal to be output from the starting control apparatus are different between the normal vehicles and the hybrid vehicles.

Thus, because the conditions for actuation and termination of the starting control to be performed by a starting control apparatus, or the making time (ON period) of pulse signals that form a start-request signal to be output from the starting control apparatus are different between normal vehicle and hybrid vehicle, a starting control apparatus that is specialized for retrofitting needs to perform respective starting control appropriate to normal vehicle and hybrid vehicle. For this reason, conventionally, a starting control apparatus specialized for a normal vehicle to control the starting of the normal vehicle, and a starting control apparatus specialized for a hybrid vehicle to control the starting of the hybrid vehicle are produced as separate products.

Various protocols are available for an in-vehicle LAN protocol. Examples of the in-vehicle LAN protocol includes controller area network (CAN), body electronics area network (BEAN), time triggered protocol (TTP/C), domestic digital bus (D2B optical), media oriented system transport (MOST), and local interconnect network (LIN). When mounting a retrofitting starting control apparatus to a vehicle, a gateway to convert protocols is arranged between a vehicle bus, which is a bus on the vehicle, and an appliance bus, which is a bus on the starting control apparatus, and a predetermined in-vehicle LAN protocol is used in the appliance bus.

For example, in a BEAN-CAN transmission system in which BEAN is used in the appliance bus and CAN is used in the vehicle bus, the starting control apparatus has to create control data for the starting control in a data format defined by CAN system (data format in an application program layer), and to put the control data by CAN system onto a transmission frame by BEAN system for transmitting. By contrast, in a BEAN-BEAN transmission system in which BEAN is used in the appliance bus and BEAN is used in the vehicle bus, the starting control apparatus has to create control data for the starting control in a data format defined by BEAN system, and to put the control data by BEAN system onto a transmission frame by BEAN system for transmitting.

Thus, data formats (type of data, assigning position of information, and the like) of a data area which is assigned control data for the starting control, i.e., bit assignments, are different between a vehicle with the BEAN-CAN transmission system and a vehicle with the BEAN-BEAN transmission system. The retrofitting starting control apparatus needs to perform respective starting control appropriate to the vehicle with the BEAN-CAN transmission system and the vehicle with the BEAN-BEAN transmission system. To achieve this, conventionally, a starting control apparatus with the BEAN-CAN transmission system and a starting control apparatus with the BEAN-BEAN transmission system are separately produced.

Conventionally, a starting control apparatus specialized for normal vehicle to perform the starting control for normal vehicle, and a starting control apparatus specialized for hybrid vehicle to perform the starting control for hybrid vehicle are separately produced as different products. This complicates production and management, and increases costs.

Moreover, conventionally, starting control apparatuses that perform the starting control in an individual data format by a different in-vehicle LAN protocol are separately produced. This complicates production and management, and increases costs.

In other words, conventional starting control apparatuses have a problem that a separate apparatus is used according to the configuration of the vehicle on which the starting control apparatus is mounted. Thus, there is a need for development of a starting control apparatus that can automatically identify the configuration of the vehicle on which it is mounted and select an appropriate starting control in accordance with a result of identified configuration.

SUMMARY OF THE INVENTION

It is an object of the present invention to at least solve the above problems.

According to an aspect of the present invention, a starting control apparatus configured to be mounted on a vehicle that has one of different vehicle configurations includes a registering unit that registers and stores therein a vehicle configuration in accordance with configuration factors of a vehicle on which the starting control apparatus is mounted; a control unit that stores therein computer programs for executing a plurality of different starting controls in accordance with the different vehicle configurations, and selects and executes a starting control corresponding to the vehicle configuration registered in the registering unit.

The above and other objects, features, and advantages of this invention are described in the following detailed description with reference to the accompanying drawings.

DETAILED DESCRIPTION OF THE PREFERRED EMBODIMENTS

Exemplary embodiments of a starting control apparatus according to the present invention will be explained below in detail with reference to accompanying drawings.

Figure 1:
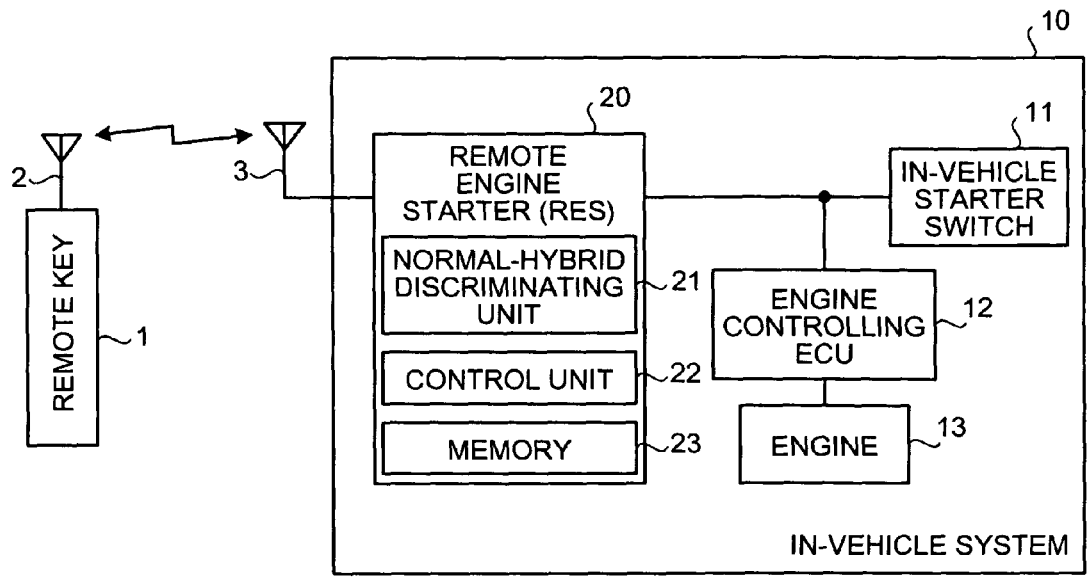
FIG. 1 is a block diagram of an in-vehicle system when a starting control apparatus according to a first embodiment is mounted on a normal vehicle.
Figure 2:
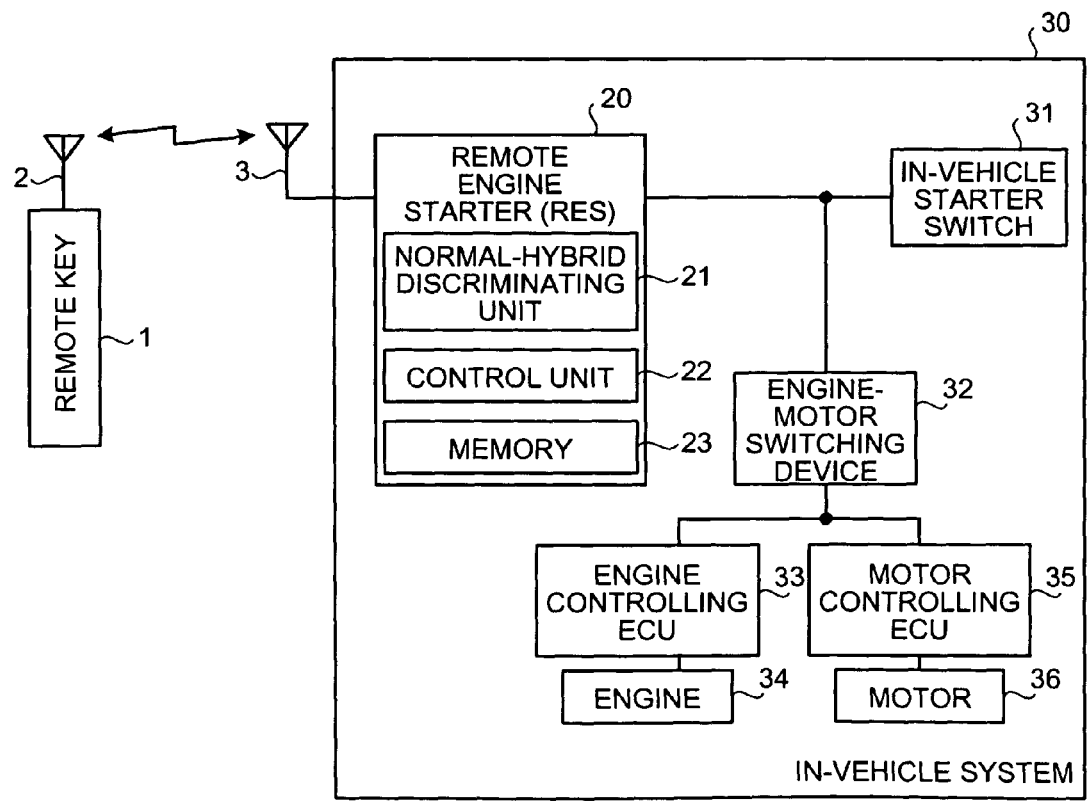
FIG. 2 is a block diagram of an in-vehicle system when the starting control apparatus according to the first embodiment is mounted on a hybrid vehicle.
Figure 3:
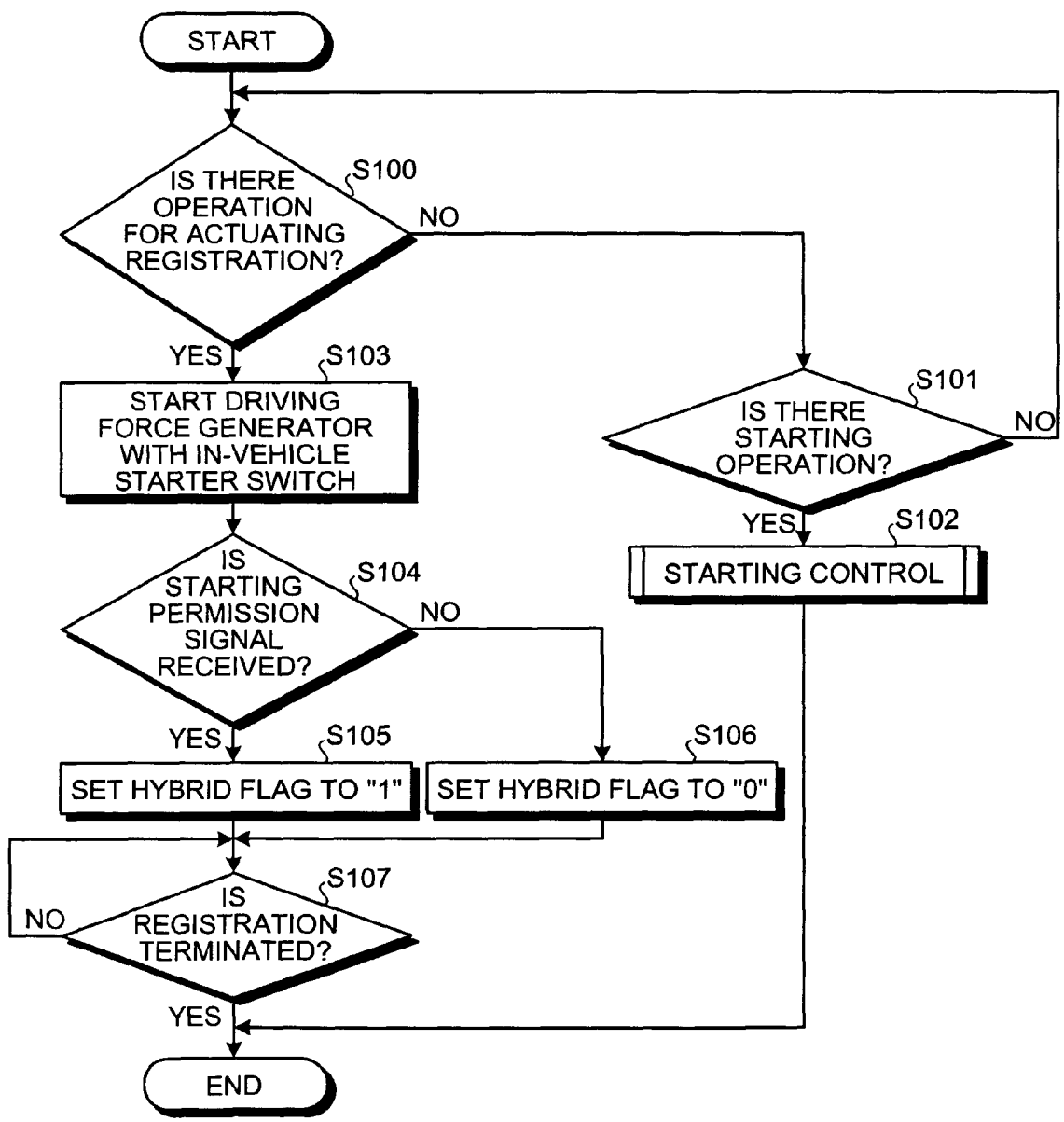
FIG. 3 is a flowchart of a registration procedure according to the first embodiment.

A first embodiment of a starting control apparatus according to the present invention is explained in accordance with FIGS. 1 to 6. The starting control apparatus according to the first embodiment is for retrofitting to a vehicle. The starting control apparatus can be mounted on a normal vehicle that has only an engine as a driving force generator, and can also be mounted on a hybrid vehicle that has an engine and a motor together. FIG. 1 depicts a state in which the starting control apparatus is mounted on a normal vehicle. FIG. 2 presents a state in which the starting control apparatus is mounted on a hybrid vehicle.

As shown in FIG. 1, an in-vehicle system 10 for normal vehicle includes an antenna 3, a remote engine starter (RES) 20 as the starting control apparatus, an in-vehicle starter switch 11, an engine controlling electrical-control-unit (ECU) 12, and an engine 13. Other ECUs, such as a body ECU that is usually provided in the in-vehicle system 10, are not shown.

A remote key 1 is a remote control terminal that a user holds. The remote key 1 transmits an engine-start request and an engine-stop request to the RES 20 in the in-vehicle system 10 via an antenna 2. The RES 20 communicates with the remote key 1 via the antenna 3. The remote key 1 can also include a function of transmitting a locking request and an unlocking request. The in-vehicle starter switch 11 is a push switch or an engine starter key, which allows a driver inside the vehicle to directly start the engine 13. Alternatively, the engine starter key can be configured to include the function of the remote key 1. The engine controlling ECU 12 electronically controls the operations of the engine 13.

As shown in FIG. 2, an in-vehicle system 30 for hybrid vehicle includes the antenna 3, the RES 20, an in-vehicle starter switch 31, an engine-motor switching device 32, an engine controlling ECU 33, an engine 34, a motor controlling ECU 35, and a motor 36. Other ECUs, such as a body ECU that is usually provided in the in-vehicle system 30, are not shown.

The in-vehicle starter switch 31 is a push switch or an engine starter key, which allows a driver inside the vehicle to directly start the engine 34 and/or the motor 36. The engine-motor switching device 32 controls switching between the engine 34 and the motor 36, and outputs various control instructions to the engine controlling ECU 33 and to the motor controlling ECU 35 for controlling the switching. The engine controlling ECU 33 electronically controls the operations of the engine 34. The motor controlling ECU 35 electronically controls the operations of the motor 36.

Next, the RES 20 for dual use that can be mounted on the in-vehicle system 10 for normal vehicle shown in FIG. 1 or the in-vehicle system 30 for hybrid vehicle shown in FIG. 2 is explained below. The RES 20 controls the starting of the vehicle in response to the engine-start request from the remote key 1, or at a predetermined time point determined by a timer (i.e., self-directively). The RES 20 includes a normal-hybrid discriminating unit 21, a control unit 22, and a memory 23.

The normal-hybrid discriminating unit 21 discriminates between normal vehicle and hybrid vehicle about the vehicle on which the RES 20 is mounted, based on a signal unique to only one of hybrid vehicle and normal vehicle. For example, the normal-hybrid discriminating unit 21 discriminates between normal vehicle and hybrid vehicle about the vehicle on which the RES 20 is mounted, based on presence of a starting permission signal (signal that indicates whether the vehicle can start) that is input from the engine-motor switching device 32 to the RES 20, only if the vehicle is a hybrid vehicle. The normal-hybrid discriminating unit 21 then registers a hybrid flag that represents a result of discrimination between normal vehicle and hybrid vehicle into the memory 23. The memory 23 includes respective starting control programs appropriate to hybrid vehicle and normal vehicle. When controlling the starting, the control unit 22 refers to the hybrid flag registered in the memory 23, selects an appropriate starting control program from the memory 23 appropriate to the hybrid flag, and then executes the selected program.

Next, process procedure performed by the RES 20 is explained with reference to flowcharts shown in FIGS. 3 to 6. To begin with, a process for registering the hybrid flag is explained with reference to FIG. 3. After an operator connects the RES 20 to the vehicle, the operator performs a specific operation for actuating registration that is a combination of operations using, for example, the remote key 1, the in-vehicle starter switch 11, and a hazard button (step S100). The operator then starts the driving force generator of the vehicle with the in-vehicle starter switch 11 (step S103). The control unit 22 of the RES 20 monitors whether any operation for actuating the registration is performed (step S100). If the specific operation for actuating the registration is detected, the control unit 22 leads the normal-hybrid discriminating unit 21 to determine whether the normal-hybrid discriminating unit 21 receives the starting permission signal (step S104). As described above, the starting permission signal is input to the RES 20 from the engine-motor switching device 32 only if the vehicle is a hybrid vehicle. Therefore, the vehicle on which the RES 20 is mounted can be discriminated between normal vehicle and hybrid vehicle based on presence of the starting permission signal.

If detecting that the starting permission signal is received, the normal-hybrid discriminating unit 21 of the RES 20 determines that the RES 20 is mounted on a hybrid vehicle, and sets the hybrid flag in the memory 23 to "1" (step S105). By contrast, if the starting permission signal cannot be detected within a predetermined time period, the normal-hybrid discriminating unit 21 determines that the RES 20 is mounted on a normal vehicle, and sets the hybrid flag in the memory 23 to "0" (step S106). When such registration processing is finished, the operator stops the driving force generator of the vehicle, and then executes a specific operation for terminating the registration. The control unit 22 of the RES 20 detects this registration terminating operation, and then terminates the registration operation (step S107).

By contrast, if receiving a start-request signal from the remote key 1 without detecting the operation for actuating the registration (step S101), the control unit 22 of the RES 20 executes the starting control of the vehicle (step S102).

Figure 4:
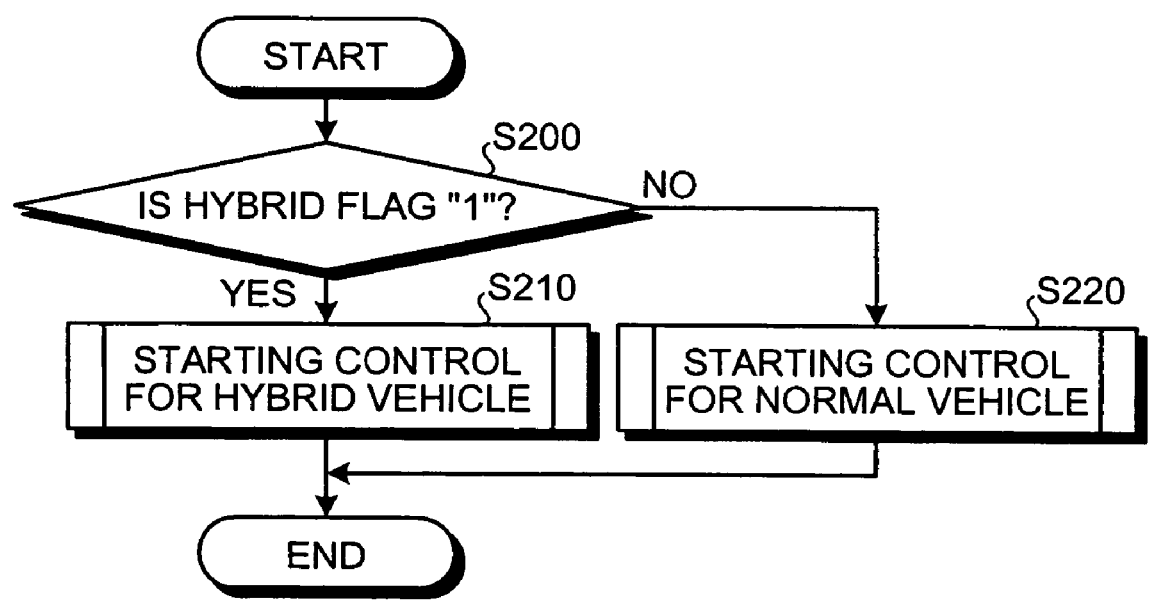
FIG. 4 is a flowchart of a starting control procedure according to the first embodiment.

FIG. 4 is a flowchart of a subroutine for the starting control of the vehicle performed by the RES 20. The control unit 22 of the RES 20 refers to the hybrid flag in the memory 23 prior to actuation of the starting control (step S200). If the hybrid flag is "1", the control unit 22 reads a starting control program for hybrid vehicle present in the memory 23, and executes the starting control for hybrid vehicle in accordance with the read starting control program (step S210). If the hybrid flag is "0", the control unit 22 reads a starting control program for normal vehicle present in the memory 23, and executes the starting control for normal vehicle in accordance with the read starting control program (step S220).

Figure 5:
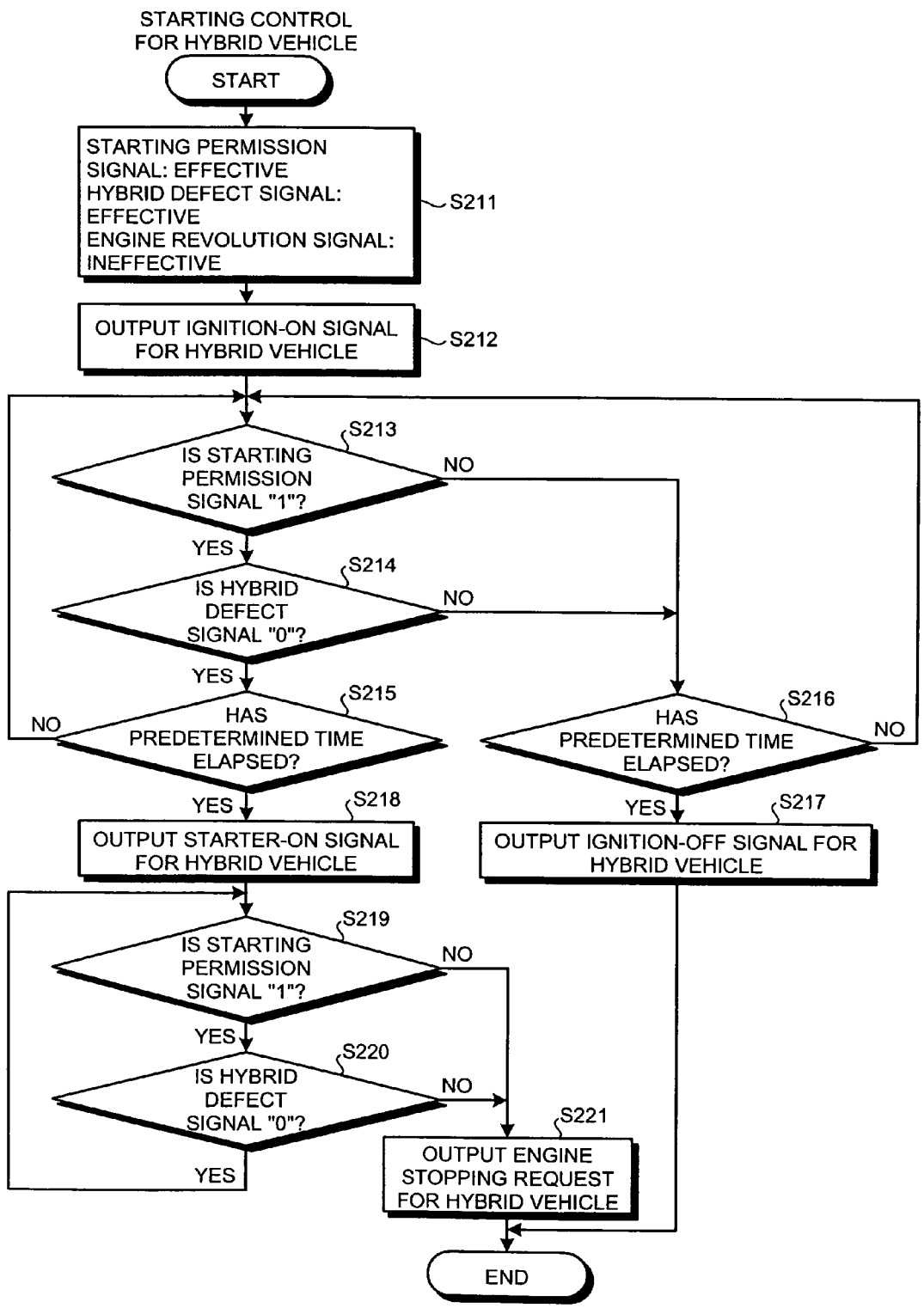
FIG. 5 is a flowchart of a starting control procedure for a hybrid vehicle according to the first embodiment.

FIG. 5 is a flowchart of the starting control for hybrid vehicle. When performing the starting control for hybrid vehicle, the control unit 22 of the RES 20 sets the starting permission signal and a hybrid defect signal (signal that presents a defect in the hybrid vehicle) in the starting control program at effective, and sets an engine revolution signal at ineffective (step S211). Precisely, the starting permission signal and the hybrid defect signal are signals that are input into the RES 20 from the engine-motor switching device 32, only if the vehicle is a hybrid vehicle. By contrast, the engine revolution signal is a signal that is input into the RES 20 from the engine controlling ECU 12, only if the vehicle is a normal vehicle. Therefore, when performing the starting control for hybrid vehicle, the starting permission signal and the hybrid defect signal in the starting control program is set at effective, and the engine revolution signal is set at ineffective.

Next, the control unit 22 of the RES 20 outputs an ignition-ON signal for hybrid vehicle to the engine-motor switching device 32. The ignition-ON signal for hybrid vehicle is one of the start-request signals, and is formed of pulse signals that have a making time for hybrid vehicle. The RES 20 then becomes ready to receive the starting permission signal and the hybrid defect signal from the vehicle (step S212). If the control unit 22 detects a state where the starting permission signal is "1" and the hybrid defect signal is "0" before a predetermined elapsed time (steps S213 to S215), the control unit 22 determines that actuating conditions for the engine starting are satisfied. After the conclusion of the predetermined elapsed time (step S215), the control unit 22 then outputs a starter-ON signal for hybrid vehicle to the engine-motor switching device 32 (step S218). The starter-ON signal is one of the start-request signals, and is formed of pulse signals that have the making time for hybrid vehicle. The engine-motor switching device 32 that receives the starter-ON signal for hybrid vehicle outputs a starting instruction to the engine controlling ECU 33 and/or the motor controlling ECU 35, and starts the engine 34 and/or the motor 36.

If the control unit 22 detects a state where the starting permission signal is "0" and the hybrid defect signal is "1" before a predetermined elapsed time (steps S213 and S214), the control unit 22 determines that actuating conditions for the engine starting are not satisfied. After the conclusion of the predetermined elapsed time (step S216), the control unit 22 outputs an ignition-OFF signal for hybrid vehicle to the engine-motor switching device 32 (step S217). The ignition-OFF signal is formed of pulse signals that have the making time for hybrid vehicle.

While warming up the engine after the engine starting, the control unit 22 discriminates states of the starting permission signal and the hybrid defect signal (steps S219 and S220). If a state of the starting permission signal at "0" or a state of the hybrid defect signal at "1" is detected, the control unit 22 outputs an engine-stop request for hybrid vehicle formed of pulse signals having the making time for hybrid vehicle to the engine-motor switching device 32 (step S221). The engine-motor switching device 32 that receives the engine-stop request for hybrid vehicle outputs a stopping instruction to the engine controlling ECU 33 and/or the motor controlling ECU 35, and stops the engine 34 and/or the motor 36 that have been started.

Figure 6:
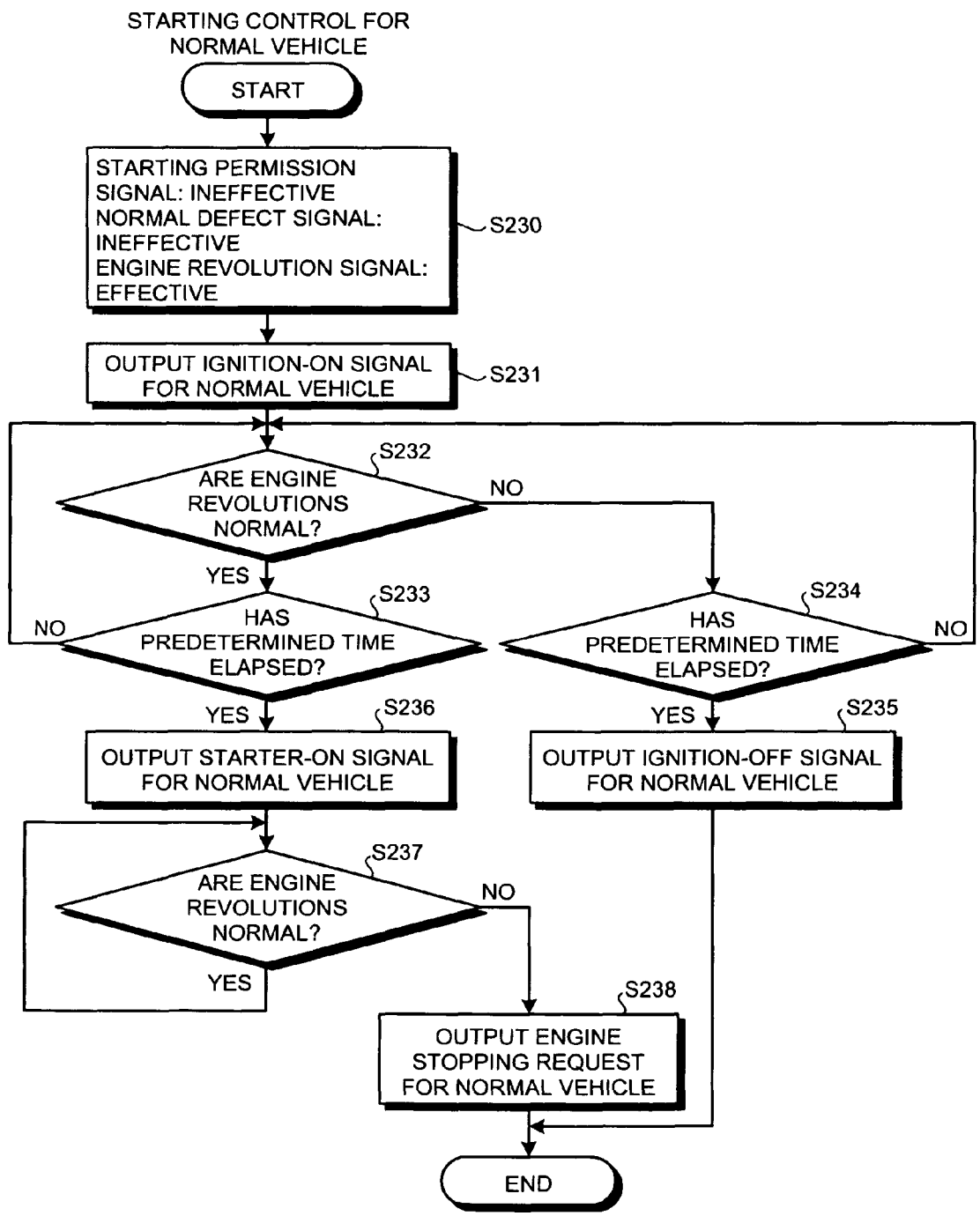
FIG. 6 is a flowchart of a starting control procedure for a normal vehicle according to the first embodiment.

FIG. 6 is a flowchart of the starting control in accordance with the starting control program for normal vehicle. When performing the starting control for normal vehicle, the control unit 22 of the RES 20 sets the starting permission signal and the hybrid defect signal in the starting control program at ineffective, and sets the engine revolution signal at effective (step S230).

Next, the control unit 22 of the RES 20 outputs an ignition-ON signal for normal vehicle formed of pulse signals that have a making time for normal vehicle to the engine controlling ECU 12, and then becomes ready to receive the engine revolution signal from the vehicle (step S231). When the engine revolution signal exceeds a first threshold TH1, or falls short of a second threshold TH2 (TH2<TH1), an engine revolution error is detected. If the control unit 22 detects the engine revolution error before a predetermined elapsed time (step S232), the control unit 22 determines that actuating conditions for the engine starting are satisfied. After the conclusion of the predetermined elapsed time (step S233), the control unit 22 then outputs a starter-ON signal for normal vehicle to the engine controlling ECU 12 (step S236). The starter-ON signal for normal vehicle is formed of pulse signals that have the making time for normal vehicle. The engine controlling ECU 12 that receives the starter-ON signal for normal vehicle starts the engine 13.

If the control unit 22 detects the engine revolution error before a predetermined elapsed time (step S232), the control unit 22 determines that actuating conditions for the engine starting are not satisfied. After the conclusion of the predetermined elapsed time (step S234), the control unit 22 then outputs an ignition-OFF signal for normal vehicle to the engine controlling ECU 12 (step S235). The ignition-OFF signal for normal vehicle is formed of pulse signals that have the making time for normal vehicle.

While warming up the engine after the engine starting, the control unit 22 determines a state of the engine revolutions (steps S237). If an engine revolution error is detected, the control unit 22 outputs an engine-stop request for normal vehicle formed of pulse signals having the making time for normal vehicle to the engine controlling ECU 12 (step S238). The engine controlling ECU 12 that receives the engine-stop request for normal vehicle stops the engine 13 that has been started.

Thus, in the first embodiment, the RES 20 discriminates between normal vehicle and hybrid vehicle about the vehicle on which the RES 20 is mounted, and selects and executes the starting control for normal vehicle or the starting control for hybrid vehicle based on the result of discrimination between normal and hybrid. Accordingly, one RES can cope with the starting control for normal vehicle and hybrid vehicle, thereby simplifying production and management, and reducing cost for equipment.

In the first embodiment, the RES 20 can automatically select the starting control for normal vehicle and hybrid vehicle. The RES 20 can be configured to perform starting control for fuel-cell vehicles. Moreover, in the first embodiment, the RES 20 discriminates between normal vehicle and hybrid vehicle about the vehicle on which the RES 20 is mounted based on presence of the starting permission signal, and stores the hybrid flag of the result of discrimination between normal and hybrid into the memory 23. The registration as normal vehicle or hybrid vehicle about the vehicle on which the RES 20 is mounted can be set with operations by an operator (for example, pushing a specific button provided on the starting control apparatus, operating a jumper switch specialized for the registration provided on the start controlling apparatus, or the like).

Figure 7:
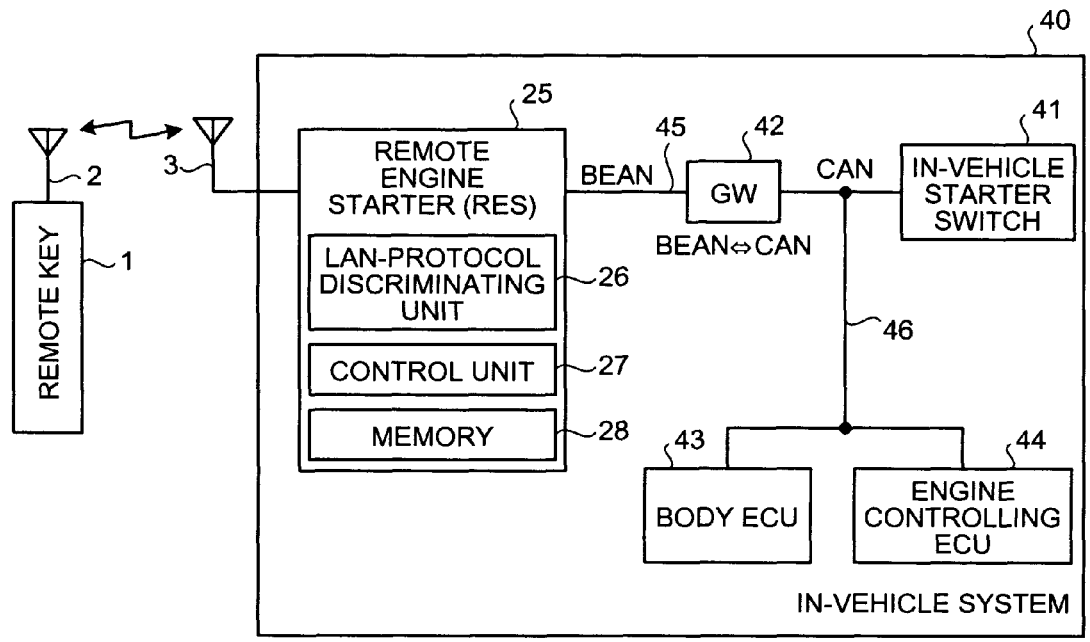
FIG. 7 is a block diagram of a starting control apparatus according to a second embodiment when the starting control apparatus is mounted to an in-vehicle system by a BEAN-CAN transmission system.
Figure 8:
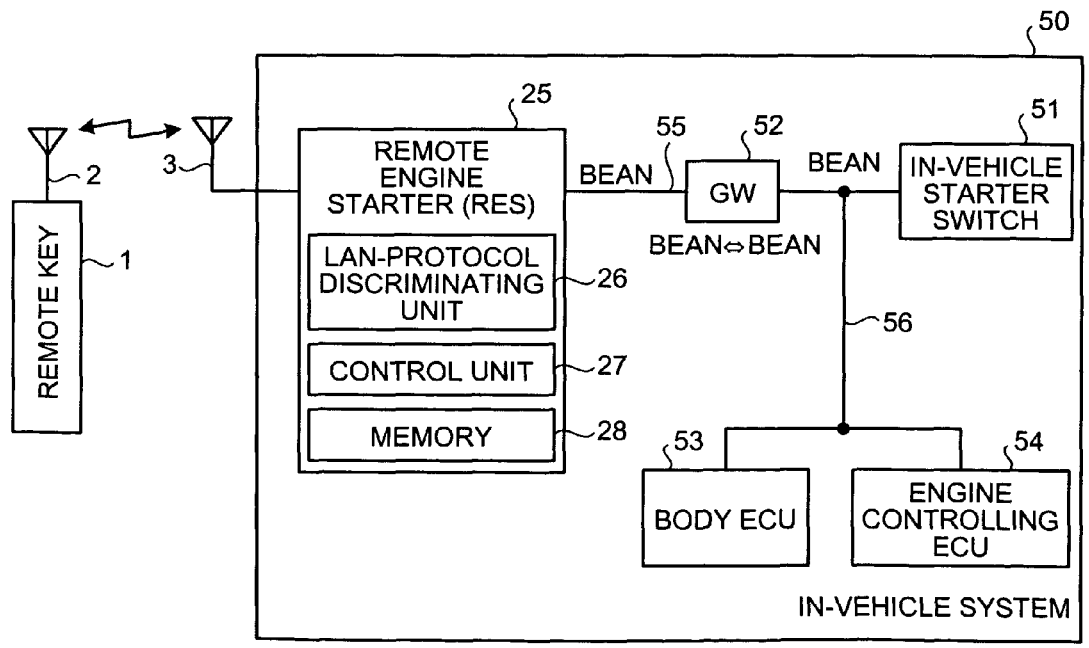
FIG. 8 is a block diagram of the starting control apparatus according to the second embodiment when the starting control apparatus is mounted to an in-vehicle system by a BEAN-BEAN transmission system.

A second embodiment of the starting control apparatus according to the present invention is explained in accordance with FIGS. 7 to 10. A starting control apparatus (RES) 25 according to the second embodiment is for retrofitting to a vehicle. The RES 25 is configured for dual use capable to be mounted to a BEAN-CAN transmission system and a BEAN-BEAN transmission system. The BEAN-CAN transmission system uses BEAN in an appliance bus connected to the RES 25, and uses CAN in a vehicle bus. The BEAN-BEAN transmission system uses BEAN in the appliance bus, and uses BEAN in the vehicle bus. FIG. 7 depicts the RES 25 mounted on an in-vehicle system by the BEAN-CAN transmission system. FIG. 8 depicts the RES 25 mounted on an in-vehicle system by the BEAN-BEAN transmission system.

As shown in FIG. 7, an in-vehicle system 40 by the BEAN-CAN transmission system includes the antenna 3, the RES 25, an in-vehicle starter switch 41, a gateway (GW) 42, a body ECU 43, and an engine controlling ECU 44.

Similarly to the first embodiment, the remote key 1 is a remote control terminal that a user holds. The remote key 1 transmits the engine-start request and the engine-stop request to the RES 25 in the in-vehicle system 10 via the antenna 2. The in-vehicle starter switch 41 is a push switch or an engine starter key, which allows a driver inside the vehicle to directly start the engine (not shown).

An appliance bus 45 connects the gateway 42 and the RES 25, and a vehicle bus 46 is present between the vehicle and the gateway 42. The appliance bus 45 uses BEAN, while the vehicle bus 46 uses CAN. The gateway 42 converts protocols between BEAN and CAN. The gateway 42 converts protocols in other than a data area in frame that is to be assigned control data for the starting control.

As shown in FIG. 8, an in-vehicle system 50 by the BEAN-BEAN transmission system includes the antenna 3, the RES 25, an in-vehicle starter switch 51, a gateway 52, a body ECU 53, and an engine controlling ECU 54.

Similarly to the first embodiment, the remote key 1 is a remote control terminal that a user holds. The remote key 1 transmits the engine-start request and the engine-stop request to the RES 25 in the in-vehicle system 10 via the antenna 2. The in-vehicle starter switch 51 is a push switch or an engine starter key, which allows a driver inside the vehicle to directly start the engine (not shown).

An appliance bus 55 connects the gateway 52 and the RES 25, and a vehicle bus 56 is present closer to the vehicle than the gateway 52. The appliance bus 55 uses BEAN, while the vehicle bus 56 uses BEAN. The gateway 52 converts protocols between BEAN and BEAN. In other words, in this case, the gateway 52 passes a frame through without converting protocols particularly.

Next, the RES 25 for dual use that can be mounted on the in-vehicle system 40 by the BEAN-CAN transmission system shown in FIG. 7 and the in-vehicle system 50 by the BEAN-BEAN transmission system shown in FIG. 8 is explained below. The RES 25 controls the starting of the vehicle in response to the engine-start request from the remote key 1, or at a predetermined time point by using a timer (i.e., self-directively). The RES 25 includes a LAN-protocol discriminating unit 26, a control unit 27, and a memory 28.

The LAN-protocol discriminating unit 26 discriminates an in-vehicle LAN protocol used in the data area in frame that is assigned the control data for the starting control, based on presence of a particular signal of each in-vehicle LAN protocol. In this case, the LAN-protocol discriminating unit 26 discriminates between CAN and BEAN which the vehicle uses. If a particular signal of BEAN is detected in the data area in frame that is assigned the control data for the starting control, the LAN-protocol discriminating unit 26 determines that the vehicle uses BEAN. While the LAN-protocol discriminating unit 26 cannot detect the particular signal of BEAN, it determines that the vehicle uses CAN. The LAN-protocol discriminating unit 26 registers a CAN flag that indicates a result of discrimination of in-vehicle LAN protocol into the memory 28.

The memory 28 stores therein a plurality of starting control programs for transmitting the control data for the starting control in a data format defined in accordance with each in-vehicle LAN protocol. In this case, the memory 28 includes a BEAN-CAN starting control program and a BEAN-BEAN starting control program. The BEAN-CAN starting control program is a program to transmit the control data for the starting control by setting on a BEAN transmission frame in a data format defined by CAN system. The BEAN-BEAN starting control program is a program to transmit the control data for the starting control by setting on a BEAN transmission frame in a data format defined by BEAN system. When controlling the starting, the control unit 27 refers to the CAN flag registered in the memory 28, selects one appropriate starting control program from the memory 28 based on the CAN flag, and then executes selected program.

Figure 9:
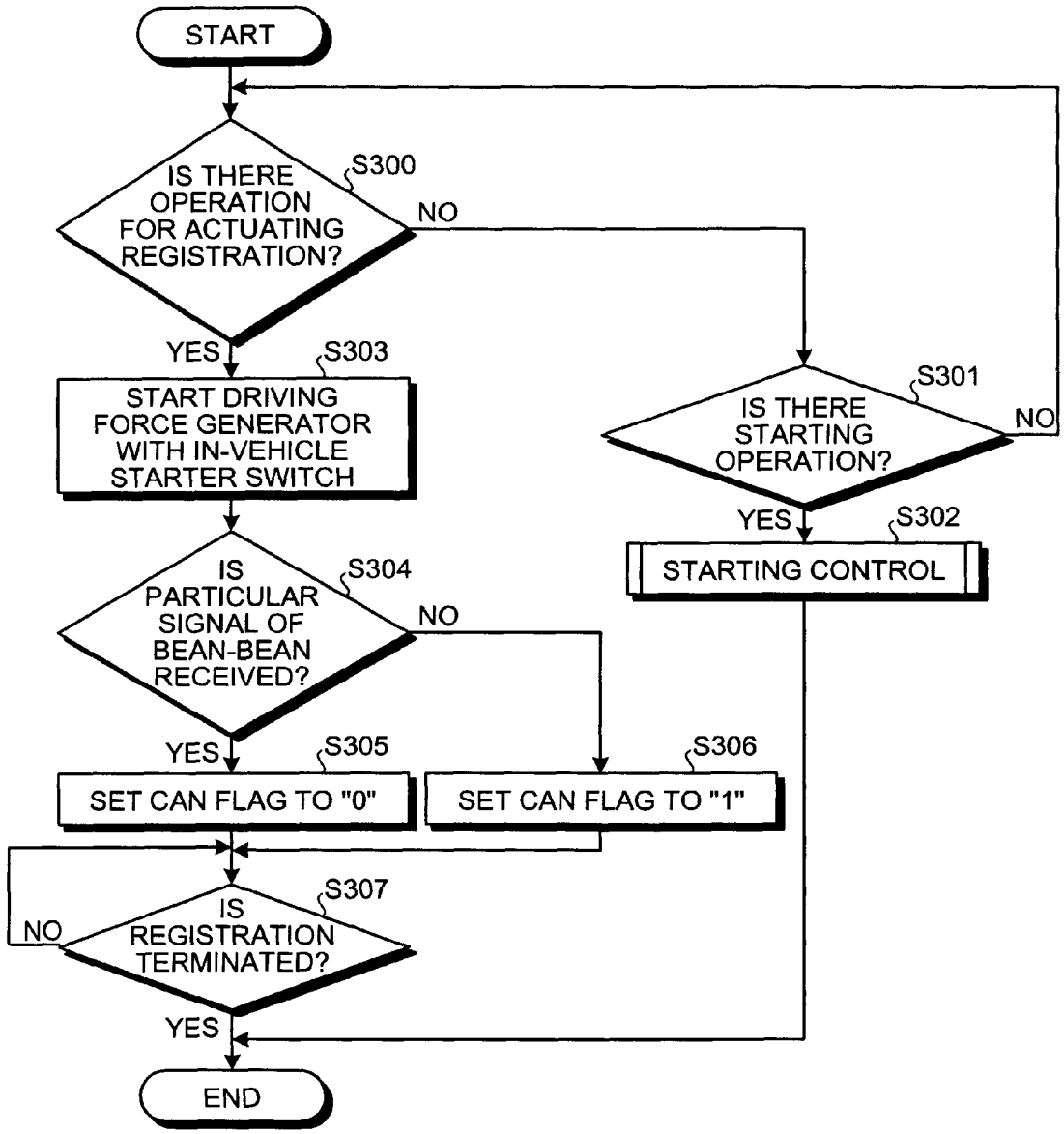
FIG. 9 is a flowchart of a registration procedure according to the second embodiment.

Next, processing movement performed by the RES 25 is explained with reference to flowcharts shown in FIGS. 9 and 10. To begin with, registration processing of the CAN flag as a flag for discriminating the in-vehicle LAN protocol is explained in accordance with FIG. 9. After the operator connects the RES 25 to the vehicle, similarly to the first embodiment, the operator performs a specific operation for actuating the registration that is a combination of operations using, for example, the remote key 1, the in-vehicle starter switch 11, and the hazard button (step S300). The operator then starts the driving force generator of the vehicle with the in-vehicle starter switch 11 (step S303). The control unit 27 of the RES 25 monitors whether any operation for actuating the registration is performed (step S300). If the specific operation for actuating the registration is detected, the control unit 27 leads the LAN-protocol discriminating unit 26 to determine whether a particular signal of the BEAN-BEAN transmission system is preset in data in the BEAN frame assigned the control data for the starting control (step S304).

If the particular signal of BEAN system is detected in the data area in received BEAN frame assigned the control data for the starting control (step S304), the LAN-protocol discriminating unit 26 of the RES 20 determines that the vehicle uses BEAN, and sets the CAN flag in the memory 28 at "0" (step S305). By contrast, if the particular signal of BEAN system cannot be detected in the data area in the received BEAN frame assigned the control data for the starting control, the LAN-protocol discriminating unit 26 determines that CAN is used on the vehicle, and sets the CAN flag in the memory 28 at "1" (step S306). When such registration processing is finished, the operator stops the driving force generator of the vehicle, and then executes a specific operation for terminating registration. The control unit 27 of the RES 25 detects this registration terminating operation, and then terminates the registration operation (step S307).

By contrast, if receiving the start-request signal from the remote key 1 without detecting the operation for actuating the registration (step S301), the control unit 27 of the RES 25 executes the starting control of the vehicle (step S302).

Figure 10:
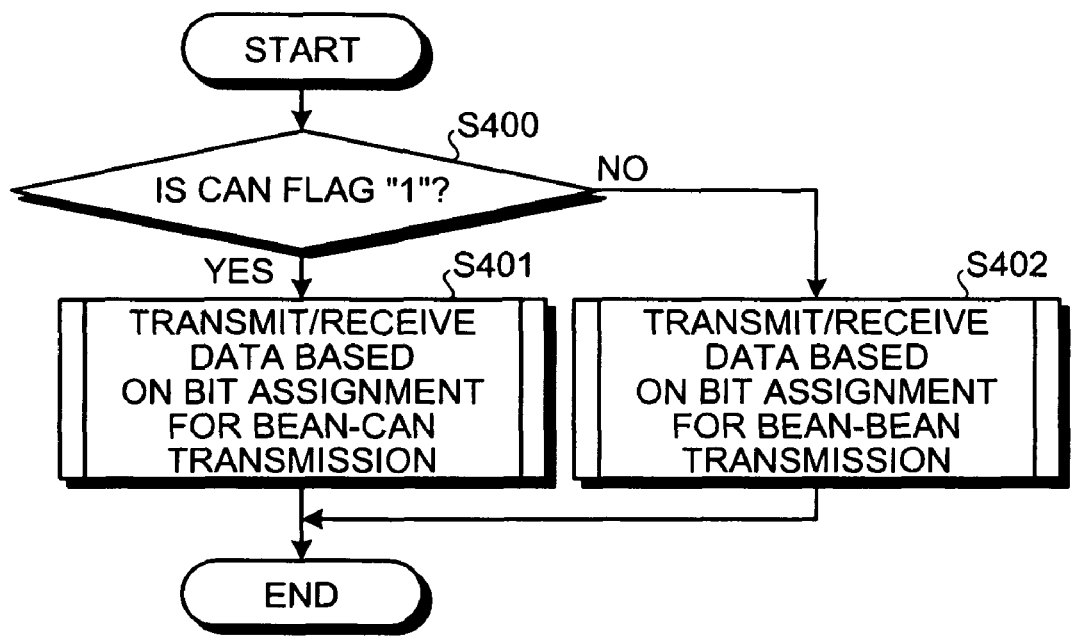
FIG. 10 is a flowchart of a starting control procedure according to the second embodiment.

FIG. 10 presents a routine of the starting control of the vehicle performed by the RES 25. The control unit 27 of the RES 25 refers to the CAN flag in the memory 23 prior to actuation of the starting control (step S400). If the CAN flag is "1", the control unit 27 reads the BEAN-CAN starting control program present in the memory 28, and executes the starting control in accordance with the BEAN-CAN starting control program (step S401). According to the starting control for the BEAN-CAN transmission system, control data for starting is created based on bit assignment defined by CAN system. Created control data by CAN system for the starting is put on a transmission frame by BEAN system, and sent to the vehicle. A frame including data based on the bit assignment by CAN and a transmission frame by BEAN is described as BEAN(CAN). If receiving a BEAN(CAN) frame, the gateway 42 shown in FIG. 7 converts protocols to convert the transmission frame by BEAN system to a transmission frame by CAN system; and sends out a CAN(CAN) frame including data based on the bit assignment by CAN and a transmission frame by CAN is sent out to the vehicle bus 46. On the other hand, when the BEAN(CAN) frame is received from the gateway 42, the control unit 27 of the RES 25 reads data in accordance with the bit assignment defined by CAN system, and executes the starting control in accordance with a result of reading.

By contrast, if the CAN flag at "0" is detected at the discrimination at step S400, the control unit 27 reads the BEAN-BEAN starting control program present in the memory 28, and executes the starting control in accordance with the BEAN-BEAN starting control program (step S402). According to the starting control for the BEAN-BEAN transmission system, control data for starting is created based on the bit assignment defined by BEAN system. Created control data by BEAN system for starting is put on a transmission frame by BEAN system, and sent to the vehicle. A frame including data based on the bit assignment by BEAN and a transmission frame by BEAN is described as BEAN(BEAN). If receiving a BEAN(BEAN) frame, the gateway 52 shown in FIG. 8 sends out the BEAN(BEAN) frame through to the vehicle bus 46 without converting protocols particularly. On the other hand, when the BEAN(BEAN) frame is received from the gateway 52, the control unit 27 of the RES 25 reads data in accordance with the bit assignment defined by BEAN system, and executes the starting control in accordance with a result of reading.

Thus, in the second embodiment, the RES 25 discriminates between CAN system and BEAN system about the in-vehicle LAN protocol used in the vehicle on which the RES 25 is mounted, selects and executes the starting control appropriate to the result of discrimination of the in-vehicle LAN protocol, and transmits the control data for the starting control based on a data format used in the vehicle defined by CAN system or BEAN system. Accordingly, one RES 25 can cope with cases where the vehicle uses CAN system and where the vehicle uses BEAN system, thereby simplifying production and management, and reducing cost for equipment.

In the second embodiment, the RES 25 is configured to cope with a case when the vehicle buses 46 and 56 are BEAN or CAN, and the appliance bus 45 is BEAN. However, the RES 25 can be configured to cope with a vehicle in which another in-vehicle LAN protocol, such as TTP/C, D2B optical, MOST, or LIN, is used in the vehicle buses 46 and 56. The appliance buses 45 and 55 can also use another in-vehicle LAN protocol, which is not limited to BEAN. In addition, the RES 25 can be configured capable to cope with three or more different in-vehicle LAN protocols. In the second embodiment, the RES 25 is configured to discriminate the in-vehicle LAN protocol used in the data area in frame that is assigned the control data for the starting control based on presence of the particular signal of each in-vehicle LAN protocol and to store the flag of the result of discrimination of the in-vehicle LAN protocol into the memory 28. The registration of the in-vehicle LAN protocol used in the vehicle on which the RES 20 is mounted can be set with operations by an operator (for example, pushing a specific button provided on the starting control apparatus, operating a jumper switch specialized for the registration provided on the start controlling apparatus, or the like).

Figure 11:
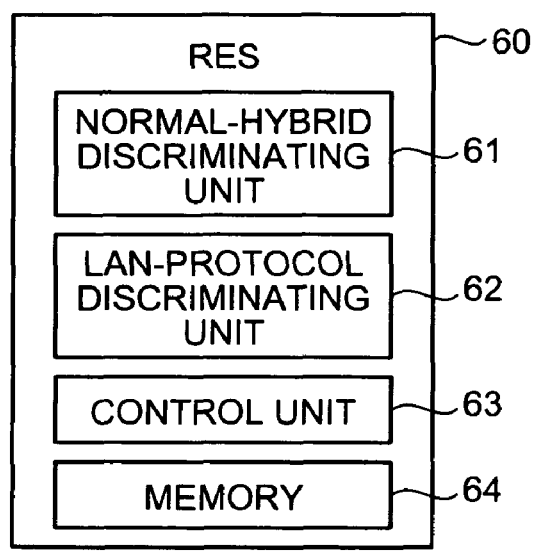
FIG. 11 is a block diagram of internal configuration of a starting control apparatus according to a third embodiment.
Figure 12:
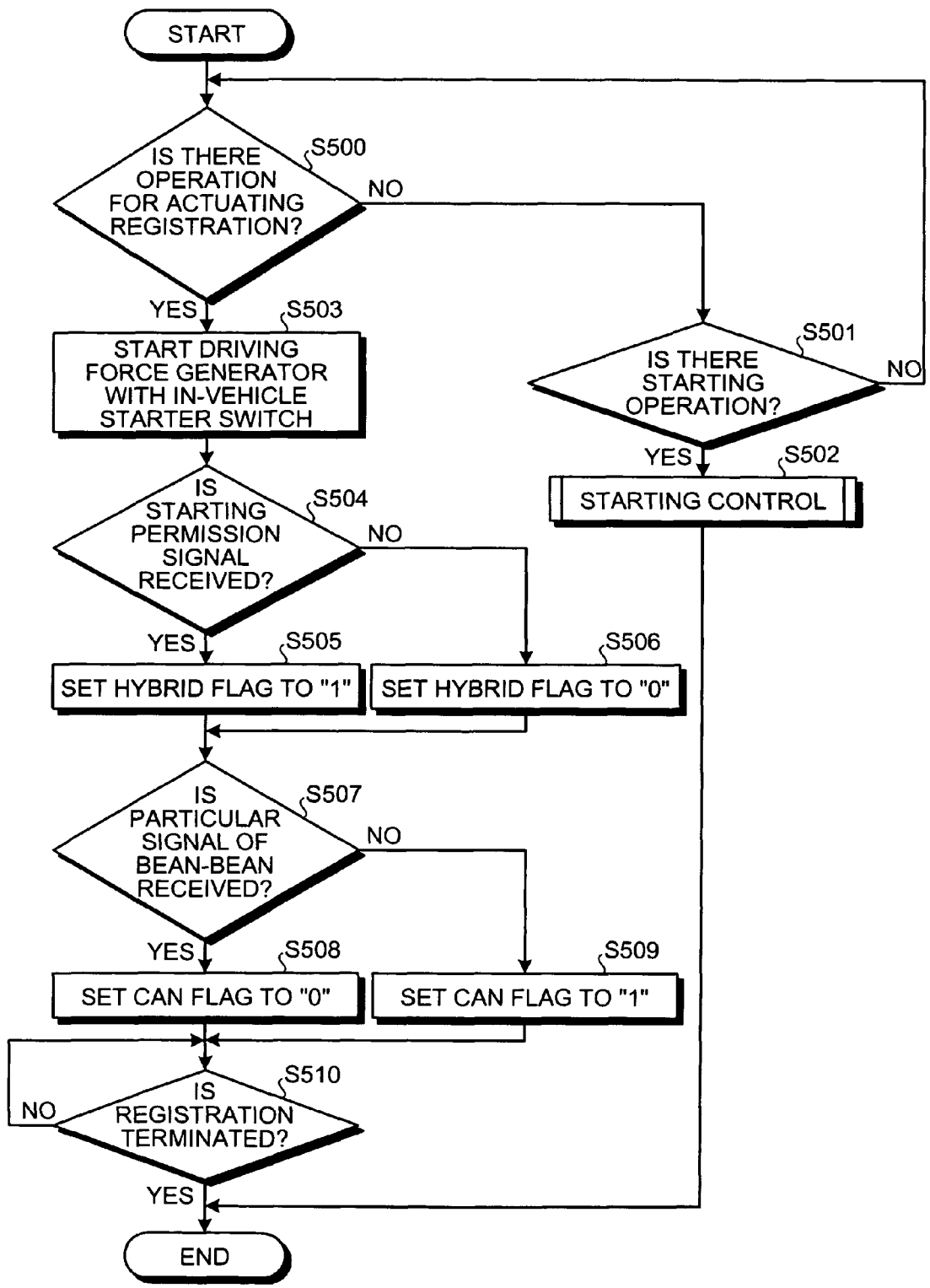
FIG. 12 is a flowchart of a registration procedure according to the third embodiment.

A third embodiment of a starting control apparatus according to the present invention is explained with reference to FIGS. 11 to 13. The third embodiment is a combination of the first embodiment and the second embodiment. In other words, a starting control apparatus (RES) 60 according to the third embodiment is to be retrofitted to a vehicle. The RES 60 can be mounted on a normal vehicle that has only an engine as a driving force generator, and can also be mounted on a hybrid vehicle that has an engine and a motor together. Furthermore, the RES 60 can be mounted to the BEAN-CAN transmission system, and also to the BEAN-BEAN transmission system. FIG. 11 presents internal configuration of the RES 60 according to the third embodiment.

The RES 60 controls the starting of the vehicle in response to the engine-start request from the remote key 1, or at a predetermined time point by using a timer (i.e., self-directively). The RES 60 includes a normal-hybrid discriminating unit 61, a LAN-protocol discriminating unit 62, a control unit 63, and a memory 64.

The normal-hybrid discriminating unit 61 discriminates between normal vehicle and hybrid vehicle about the vehicle on which the RES 60 is mounted, based on a signal unique to only one of hybrid vehicle and normal vehicle (for example, the starting permission signal). The normal-hybrid discriminating unit 61 then registers the hybrid flag that represents the result of discrimination between normal and hybrid into the memory 64. The LAN-protocol discriminating unit 26 discriminates an in-vehicle LAN protocol used in the data area in frame that is assigned the control data for the starting control, based on presence of a particular signal of each in-vehicle LAN protocol. In this case, the LAN-protocol discriminating unit 62 discriminates between CAN and BEAN which the vehicle uses. The LAN-protocol discriminating unit 62 registers the CAN flag (which is "1" in a case of CAN, or is "0" in a case of BEAN) that indicates the result of discrimination of the in-vehicle LAN protocol into the memory 64.

The memory 64 includes a starting control program for hybrid vehicle and a starting control program for normal vehicle appropriate to a hybrid vehicle and a normal vehicle respectively, a BEAN-CAN starting control program, and a BEAN-BEAN starting control program. The BEAN-CAN starting control program is a program to transmit the control data for the starting control by setting on a BEAN transmission frame in the data format defined by CAN system, and the BEAN-BEAN starting control program is a program to transmit the control data for the starting control by setting on a BEAN transmission frame in the data format defined by BEAN system. When controlling the starting, the control unit 63 refers to the hybrid flag and the CAN flag registered in the memory 64, selects two appropriate starting control programs from the memory 64 based on the hybrid flag and the CAN flag, and then executes selected programs.

Next, processing movement performed by the RES 60 is explained with reference to flowcharts shown in FIGS. 12 and 13. To begin with, registration processing of the hybrid flag is explained in accordance with FIG. 12. After the operator connects the RES 60 to the vehicle, the operator performs a specific operation for actuating the registration (step S500). The operator then starts the driving force generator of the vehicle with the in-vehicle starter switch (step S503). The control unit 63 of the RES 60 monitors whether any operation for actuating the registration is performed (step S500). If the specific operation for actuating the registration is detected, the control unit 63 leads the normal-hybrid discriminating unit 61 to determine whether the normal-hybrid discriminating unit 61 receives the starting permission signal (step S504).

If detecting that the starting permission signal is received, the normal-hybrid discriminating unit 61 of the RES 60 determines that the RES 60 is mounted on a hybrid vehicle, and sets the hybrid flag in the memory 64 at "1" (step S505). By contrast, if the starting permission signal cannot be detected for longer than a predetermined time period, the normal-hybrid discriminating unit 61 determines that the RES 60 is mounted on a normal vehicle, and sets the hybrid flag in the memory 64 at "0" (step S506).

If the particular signal of BEAN system is detected in the data in the received BEAN frame assigned the control data for the starting control (step S507), the LAN protocol discriminating unit 62 of the RES 60 determines that the vehicle uses BEAN, and sets the CAN flag in the memory 64 at "0" (step S508). By contrast, if the particular signal of BEAN system cannot be detected in the data in the received BEAN frame assigned the control data for the starting control, the LAN-protocol discriminating unit 62 determines that CAN is used on the vehicle, and sets the CAN flag in the memory 64 at "1" (step S509). When such registration processing is finished, the operator stops the driving force generator of the vehicle, and then executes a specific operation for terminating the registration. The control unit 63 of the RES 60 detects this registration terminating operation, and then terminates the registration operation (step S510).

By contrast, if receiving the start-request signal, for example, from the remote key 1, without detecting the operation for actuating the registration (step S501), the control unit 63 of the RES 60 executes the starting control of the vehicle (step S502).

Figure 13:
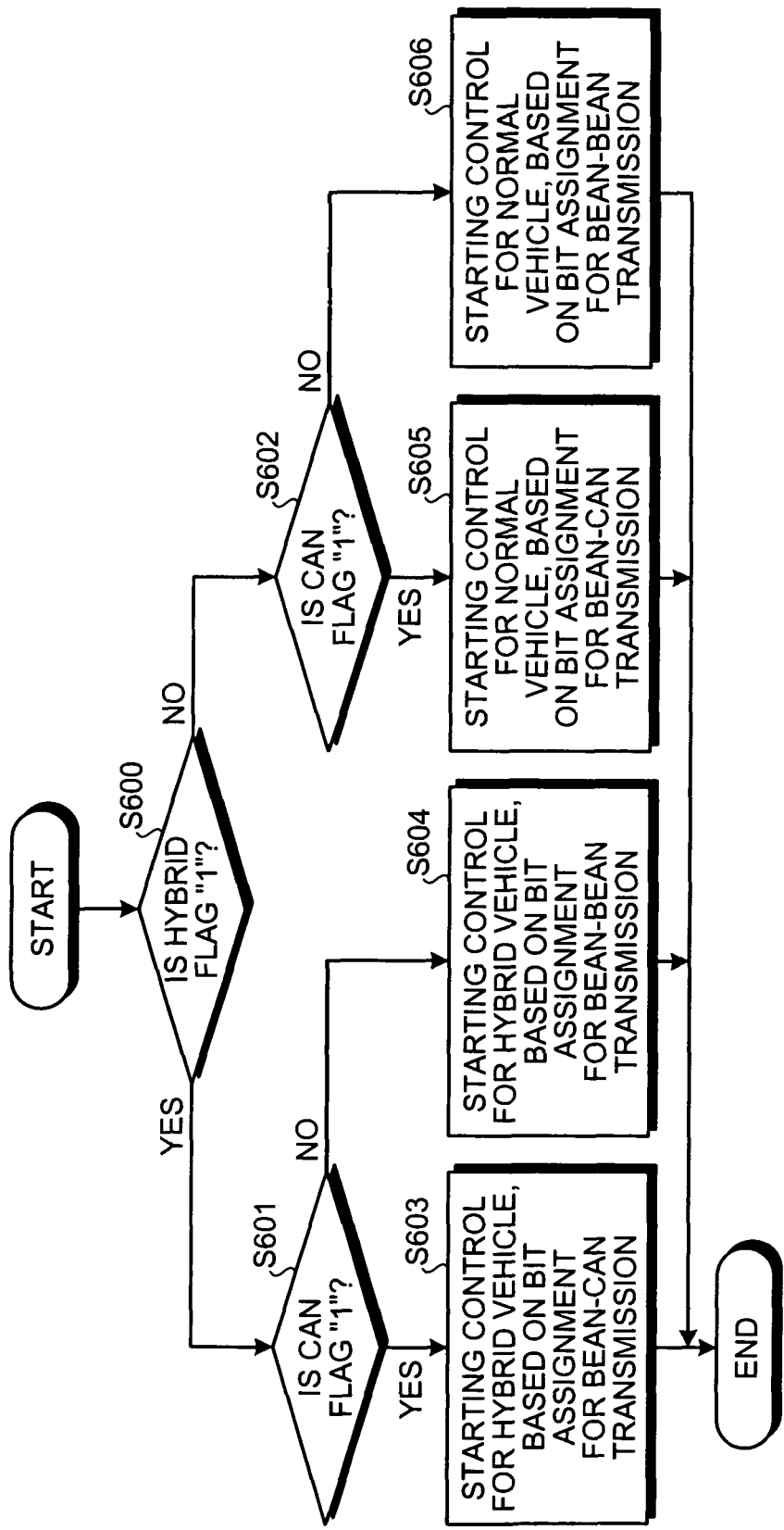
FIG. 13 is a flowchart of a starting control procedure according to the third embodiment.

FIG. 13 presents a routine of the starting control of the vehicle performed by the RES 60. The control unit 63 of the RES 60 refers to the hybrid flag and the CAN flag in the memory 64 prior to actuation of the starting control (steps S600, S601, and S602).

If the hybrid flag is "1" and the CAN flag is "1", the control unit 63 reads the starting control program for hybrid vehicle and the BEAN-CAN starting control program present in the memory 64, and executes the starting control in accordance with these starting control programs (step S603). In this starting control, control data for starting is created based on the bit assignment defined by CAN system. Created control data by CAN system for the starting is put on a transmission frame by BEAN system and sent to the vehicle. Data in received frame is read in accordance with the bit assignment defined by CAN system. The procedure of the starting control is performed in accordance with the starting control procedure for hybrid vehicle shown in FIG. 5.

In contrast, if the hybrid flag is "1" and the CAN flag is "0", the control unit 63 reads the starting control program for hybrid vehicle and the BEAN-BEAN starting control program present in the memory 64, and executes the starting control in accordance with these starting control programs (step S604). In this starting control, control data for starting is created based on the bit assignment defined by BEAN system. Created control data by BEAN system for the starting is put on a transmission frame by BEAN system and sent to the vehicle. Data in received frame is read in accordance with the bit assignment defined by BEAN system. The procedure of the starting control is performed in accordance with the starting control procedure for hybrid vehicle shown in FIG. 5.

In addition, if the hybrid flag is "0" and the CAN flag is "1", the control unit 63 reads the starting control program for normal vehicle and the BEAN-CAN starting control program present in the memory 64, and executes the starting control in accordance with these starting control programs (step S605). In this starting control, control data for starting is created based on the bit assignment defined by CAN system. Created control data by CAN system for the starting is put on a transmission frame by BEAN system and sent to the vehicle. Data in received frame is read in accordance with the bit assignment defined by CAN system. The procedure of the starting control is performed in accordance with the starting control procedure for normal vehicle shown in FIG. 6.

In addition, if the hybrid flag is "0" and the CAN flag is "0", the control unit 63 reads the starting control program for normal vehicle and the BEAN-BEAN starting control program present in the memory 64, and executes the starting control in accordance with these starting control programs (step S606). In this starting control, control data for starting is created in accordance with the bit assignment defined by BEAN system. Created control data by BEAN system for the starting is put on a transmission frame by BEAN system and sent to the vehicle. Data in received frame is read in accordance with the bit assignment defined by BEAN system. The procedure of the starting control is performed in accordance with the starting control procedure for normal vehicle shown in FIG. 6.

Thus, in the third embodiment, the RES 60 discriminates between normal vehicle and hybrid vehicle about the vehicle on which the RES 60 is mounted, and between CAN system and BEAN system about the in-vehicle LAN protocol used in the vehicle on which the RES 60 is mounted, selects and executes the starting control appropriate to these results of discrimination between normal and hybrid, and discrimination of the in-vehicle LAN protocol. Accordingly, one RES 60 can cope with starting control for normal vehicle and hybrid vehicle, and starting control when the vehicle uses CAN system and when the vehicle uses BEAN system, thereby simplifying production and management, and reducing cost for equipment.

In the first and second embodiments, examples of the starting control apparatus applicable to different vehicle configuration factors, such as the starting control apparatus applicable to both normal vehicle and hybrid vehicle, and the starting control apparatus applicable to different in-vehicle LAN protocols, are described. However, the present invention is not limited to these. The starting control apparatus can be configured capable to operate by absorbing differences in vehicle configurations factors between vehicles on which the starting control apparatus is to be mounted. To configure software programs so as to operate by absorbing such differences in vehicle configuration factors, the software programs includes a basic application program for basic processing of remote starting control, and additional application programs and converting tables for executing processing that absorbs the differences in the vehicle configuration factors. Consequently, if adding a function for absorbing a new difference in the vehicle configuration factors, the basic application program is not changed, while the additional application programs and the converting tables are added or changed, thereby coping with an addition of a function easily.

Further effects and variants can be easily led by one skilled in the art. Aspects of the present invention are not limited to specific embodiments as explained above. Therefore, various modifications can be achieved without departing from a scope of inventive concepts according to appended claims and equivalents.

INDUSTRIAL APPLICABILITY

As described above, the starting control apparatus according to embodiment of the present invention is useful for starting control of a vehicle and suitable for a remote starting device when configurations of vehicles on each of which the starting control apparatus is mounted on vary.

What is claimed is:

1. A starting control apparatus mounted on a vehicle that has a vehicle configuration among plural vehicle configurations that include a first vehicle configuration for a normal vehicle having an engine as a driving force generator and a second vehicle configuration for a hybrid vehicle having an engine and a motor as a driving force generator, wherein the normal vehicle and the hybrid vehicle are different vehicles, the starting control apparatus comprising:
a first storage unit that stores therein vehicle information indicative of the plural vehicle configurations including the first vehicle configuration and the second vehicle configuration;
a second storage unit that stores therein computer program codes for executing plural starting controls in accordance with respective vehicle configurations including the first vehicle configuration and the second vehicle configuration;
a discriminating unit that discriminates between the normal vehicle and the hybrid vehicle; and
a control unit that selects the vehicle information corresponding to the vehicle based on a result of discrimination and executes a starting control of the vehicle based on the computer program codes corresponding to the selected vehicle information, wherein the discriminating unit is configured to receive a starting permission signal that indicates whether the vehicle can start, and to discriminate between the normal vehicle and the hybrid vehicle based on whether the starting permission signal is received from the vehicle.

2. The starting control apparatus according to claim 1, wherein the discriminating unit receives a configuration signal from the vehicle indicative of the vehicle configuration of the vehicle, and discriminates the vehicle configuration of the vehicle based on a received configuration signal, and
the discriminating unit stores a result of discrimination of the vehicle configuration of the vehicle into the first storage unit.

3. The starting control apparatus according to claim 2, wherein the second storage unit prestores therein computer program codes for executing a starting control for the normal vehicle and a starting control for the hybrid vehicle, and
the control unit selects and executes the starting control based on the computer program codes corresponding to the result of discrimination between the normal vehicle and the hybrid vehicle.

4. The starting control apparatus according to claim 3, wherein the control unit alters durations of pulse signals that form a start-request signal to be transmitted to the vehicle in accordance with either when performing the starting control for the normal vehicle or when performing the starting control for the hybrid vehicle.

5. The starting control apparatus according to claim 3, wherein, the starting control includes setting a starting activating condition and a starting terminating condition for the starting control for the normal vehicle based on engine revolutions, and
the starting control includes setting a starting activating condition and a starting terminating condition for the starting control for the hybrid vehicle based on the starting permission signal that indicates whether the vehicle can start, and a hybrid defect signal that indicates the hybrid vehicle has a defect.

6. The starting control apparatus according to claim 1, wherein the control unit alters durations of pulse signals that form a start-request signal to be transmitted to the vehicle in accordance with either when performing the starting control for the normal vehicle or when performing the starting control for the hybrid vehicle.

7. The starting control apparatus according to claim 1, wherein,
the starting control includes setting a starting activating condition and a starting terminating condition for the starting control for the normal vehicle based on engine revolutions, and
the starting control includes setting a starting activating condition and a starting terminating condition for the starting control for the hybrid vehicle based on the starting permission signal that indicates whether the vehicle can start, and a hybrid defect signal that indicates the hybrid vehicle has a defect.

* * * * *